(No Model.)
F. P. WHITE.
AXLE LUBRICATOR.
No. 521,578. Patented June 19, 1894.
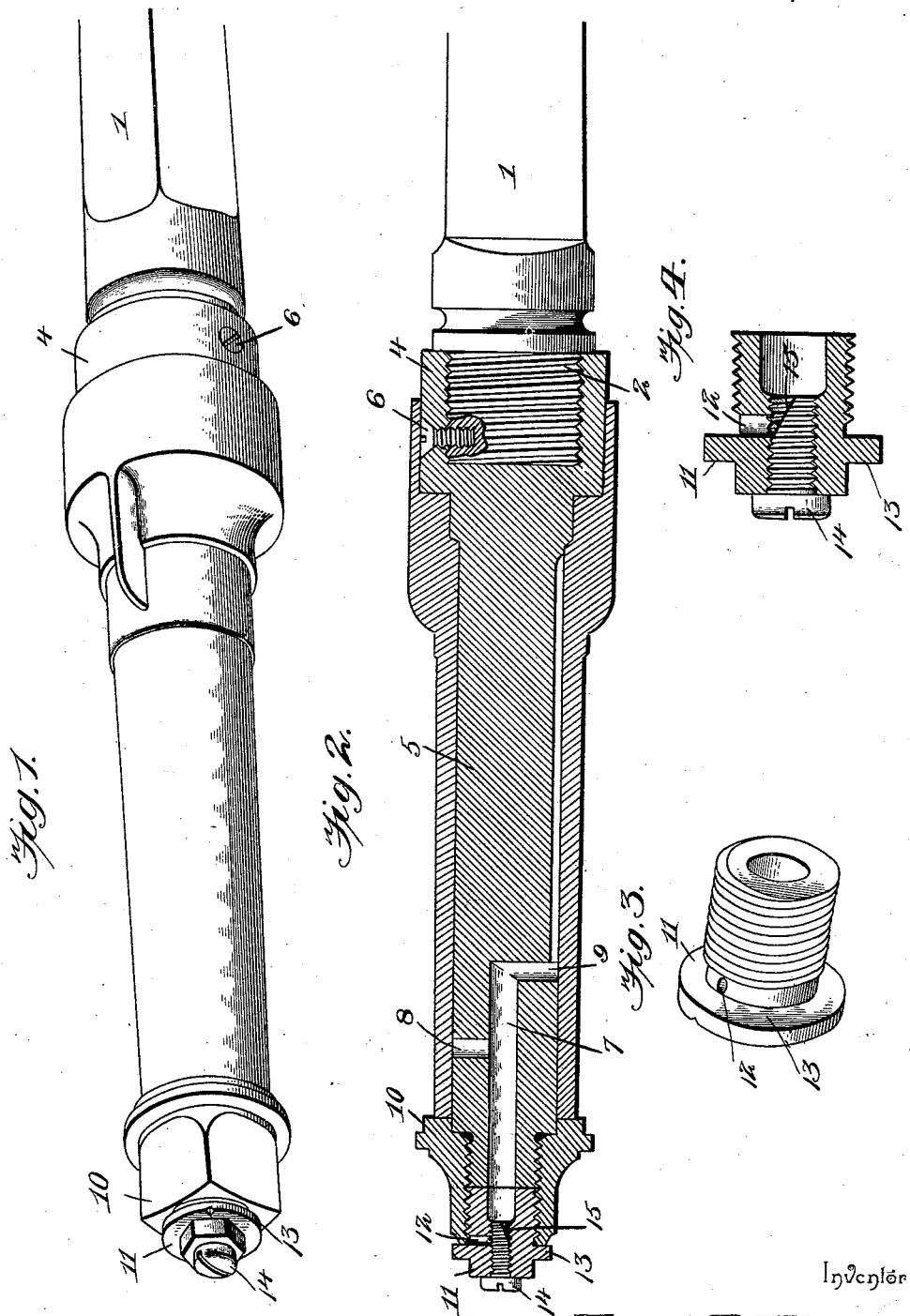
Witnesses
Inventor
Frank P. White,
By his Attorneys.
C. A. Snow & Co.

UNITED STATES PATENT OFFICE.

FRANKLIN P. WHITE, OF SHALLOTTE, NORTH CAROLINA.

AXLE-LUBRICATOR.

SPECIFICATION forming part of Letters Patent No. 521,578, dated June 19, 1894.

Application filed January 31, 1894. Serial No. 498,635. (No model.)

*To all whom it may concern:*

Be it known that I, FRANKLIN P. WHITE, a citizen of the United States, residing at Shallotte, in the county of Brunswick and State of North Carolina, have invented a new and useful Axle-Lubricator, of which the following is a specification.

The invention relates to improvements in axles.

The object of the present invention is to improve the construction of axle lubricators, and to provide simple and efficient means for lubricating an axle without removing the wheel.

The invention consists in the construction and novel combination and arrangement of parts, hereinafter fully described, illustrated in the accompanying drawings and pointed out in the claims hereto appended.

In the drawings—Figure 1 is a perspective view of one end of the axle constructed in accordance with this invention. Fig. 2 is a longitudinal sectional view of the same. Fig. 3 is a detail perspective view of the vent screw. Fig. 4 is a longitudinal sectional view of the same, showing the adjustable screw for closing the vent opening arranged to permit a lubricant to be introduced into the vent screw.

Like numerals of reference indicate corresponding parts in all the figures of the drawings.

1 designates the body of an axle; it is provided with threaded ends, each one of which fits into an interiorly threaded socket 4 of a spindle 5; and the threaded end 2 of the body of the axle is secured in the socket by screws 6, whereby all liability of the spindle unscrewing is prevented. The spindle is provided with a longitudinal opening or bore 7, provided adjacent to its inner terminus with outlets 8 and 9, whereby a lubricant is conveyed from the longitudinal opening or bore to the exterior surface of the spindle for greasing the axle. By arranging the outlet openings at different points, a full supply of lubricant is insured to the axle, and the rotation of the wheel will convey the lubricant to all parts of the spindle.

The axle nut 10, is provided with a threaded opening extending entirely through it; and a hollow vent screw 11 is arranged in the outer end of the axle nut. The vent screw is provided with an opening 12, arranged adjacent to the flange 13, and communicating with the longitudinal opening in the spindle, and adapted, when the vent screw is unscrewed from the axle nut sufficiently to expose the opening 12, to permit oil to be supplied to the axle by inserting the nozzle of an oil can into it. The opening 12 of the vent screw is sealed by an adjusting screw 14, mounted in a threaded opening at the outer end of the vent screw, and terminating at its inner end directly beneath the opening 12; the inner end of the adjustable screw is beveled at 15, and when this beveled portion is turned opposite the opening, as illustrated in Fig. 4 of the accompanying drawings, free communication is established between the opening 12 and the interior of the vent screw.

The interior of the vent screw is adapted, when the latter is unscrewed, to increase the capacity of the axle nut, which is designed to be removed, when the axle is to be lubricated by the ordinary thick axle grease, in which case, the nut is filled with such lubricant. As the nut is screwed home, the axle grease will be forced into the longitudinal bore or opening of the spindle, and the inward screwing of the vent screw will increase the effect. It will thus be apparent that an axle may be readily greased without removing the wheel.

It will be seen that the means for lubricating an axle are simple and comparatively inexpensive in construction, that oil may be readily supplied to the spindle without removing the axle nut, as the vent screw and the adjusting screw are exteriorly arranged and are exposed to the action of a tool, and that a heavy lubricant such as axle grease may be conveyed to the exterior surface of the spindle without removing the wheel.

Changes in the form, proportion and the minor details of construction may be resorted to without departing from the principle or sacrificing any of the advantages of this invention.

What I claim is—

1. The combination of a spindle having a longitudinal opening, and provided with an outlet, an axle nut arranged on the spindle, a hollow vent screw screwing into the outer end of the axle nut and having its outer end exposed and provided at one side with an opening communicating with its interior, and an adjusting screw mounted on the vent screw to close the vent opening and having its head arranged on the exterior of the vent screw, substantially as described.

2. The combination of a spindle having a longitudinal bore and provided with an outlet communicating with the exterior of the spindle, an axle nut having its threaded opening extending entirely through it, a hollow vent screw arranged in the outer end of the axle nut, and provided with a vent opening communicating with its interior, said vent screw being provided at its outer end with a threaded opening, and an adjusting screw having its inner end beveled and arranged at the inner terminus of the vent opening, substantially as and for the purpose described.

In testimony that I claim the foregoing as my own I have hereto affixed my signature in the presence of two witnesses.

FRANK. P. WHITE.

Witnesses:
J. B. RUARK,
R. B. MORSE.